United States Patent
Sakamoto

[15] 3,670,355
[45] June 20, 1972

[54] WIPER ASSEMBLY FOR VEHICLES
[72] Inventor: Kashira Sakamoto, 12, Tennocho-7-chome, Kariya, Japan
[22] Filed: Feb. 4, 1971
[21] Appl. No.: 112,677

[30] Foreign Application Priority Data
March 23, 1970 Japan..................................45/27738

[52] U.S. Cl. ........................................15/250.32, 15/250.35
[51] Int. Cl. ..........................................................B60s 1/40
[58] Field of Search ..........15/250.2, 250.3, 250.31, 250.32, 15/250.35, 250.42

[56] References Cited
UNITED STATES PATENTS 2,094,732 5/1937 Anderson...........................15/250.35 X
2,852,796 9/1958 Leins................................15/250.32 X
3,188,679 6/1965 Wubbe...............................15/250.35

FOREIGN PATENTS OR APPLICATIONS 105,750 11/1938 Australia............................15/250.32

Primary Examiner—Peter Feldman
Attorney—Cushman, Darby & Cushman

[57] ABSTRACT

A wiper assembly in which an arm piece consisting of two rods combined with each other, and a blade element are pivotably connected with each other by means of a pivot pin extending through holes formed in the flat portions at the end extremities of said rods and holes formed in a connector for attaching said blade element to said arm piece.

3 Claims, 5 Drawing Figures

INVENTOR
Kashira SAKAMOTO
BY Cushman, Darby & Cushman
ATTORNEYS

WIPER ASSEMBLY FOR VEHICLES

The present invention relates to a wiper assembly for use with automobiles or the like, and more particularly to improvements in the connection of a wiper arm to a blade element, by which the lifting of said blade element under the force of an upward air flow on the vehicle body during travel of the vehicle at high speeds is prevented, said arm piece being of the type consisting of two rods combined with each other so as to minimize the resistance to air.

Heretofore, a wiper arm of the type described and a blade element have been connected with each other by the engagement of a leaf spring secured to a fixing plate at the end extremities of the two rods, with a connector pivotably provided on said blade element for connecting said blade element to said wiper arm.

Such a conventional connecting structure had the disadvantage that it involves a large number of component parts and hence is complicated and expensive.

In order to eliminate such disadvantage, the present invention has for its object the provision of an inexpensive wiper assembly of simple structure involving a minimum number of component parts, in which the end extremities of arm piece-constituting rods are made flat, and the arm piece and a blade element are pivotably connected with each other by means of a pivot pin extending through holes formed in said flat end extremities of the rods and holes formed in a connector provided on said blade element, without using a leaf spring or any other connecting members.

The present invention will be described in detail by way of example with reference to the accompanying drawings, in which.

Figure 1:
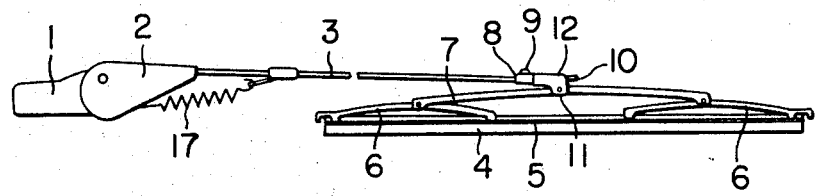
FIG. 1 is a front elevational view of a conventional wiper assembly including an arm and a blade element.
Figure 3:
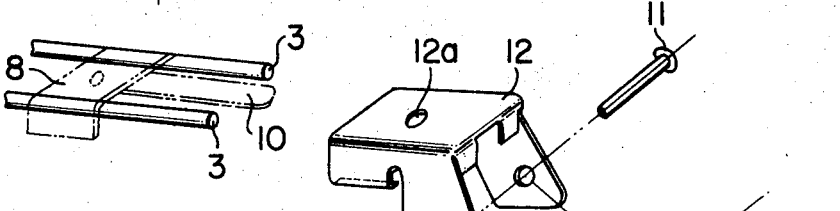
FIG. 3 is an exploded enlarged perspective view of the essential portion of the conventional wiper assembly shown in FIG. 1.

Referring to FIGS. 1 and 3 there is shown a conventional wiper assembly. As shown in FIG. 1, an arm piece 3 consisting of two rods is welded to a retainer 2 which is pivotably connected to an arm head 1. A wiper arm is composed of the arm head 1, the retainer 2 and the arm piece 3. A blade element is composed of a blade 4 made of a resilient material, such as rubber, a pair of secondary yokes 6 supporting said blade 4 through an elongate leaf spring 5, and a primary yoke 7 supporting said secondary yokes 6. The structure of the connection between the wiper arm and the blade element will be described in detail with reference to FIG. 3. Referring first to the wiper arm, a leaf spring 10 having a projecting lug 10a is secured to a fixing plate 8 by means of a rivet 9, which fixing plate 8 is in turn secured to the end extremity of the arm piece 3. On the blade element side, a substantially cylindrical connector 12 is pivotably connected to the primary yoke 7 and a hole 12a is bored through the upper wall of said connector 12 for interlocking engagement with the aforesaid projecting lug 10a of the leaf spring 10. The wiper arm and the blade element are connected with each other by inserting the end extremity of the arm piece 3 into the connector 12 and engaging the projecting lug 10a of the leaf spring 10 with the hole 12a in the connector 12. Such a conventional wiper assembly has the drawback that it involves a large number of component parts and hence is complicated in construction and expensive, as stated previously.

Figure 2:
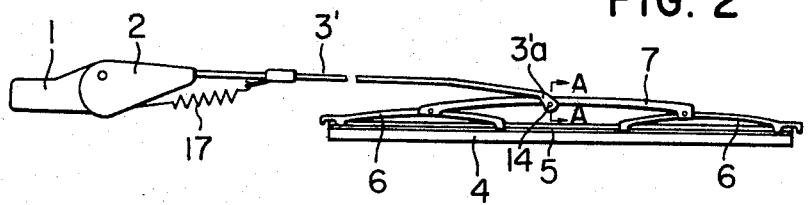
FIG. 2 is a front elevational view of an embodiment of the wiper assembly according to the invention including an arm and a blade element.
Figure 5:
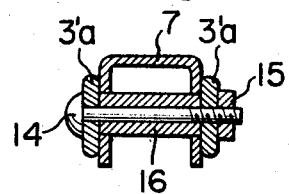
FIG. 5 is a cross-sectional view taken on the line A—A of FIG. 2.
Figure 4:
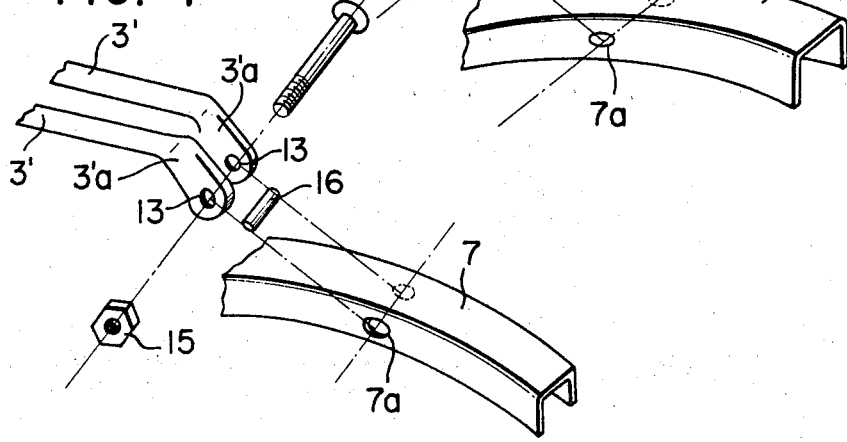
FIG. 4 is an exploded enlarged perspective view of the essential portion of the wiper assembly according to the invention.

In FIGS. 2, 4 and 5 there is shown an embodiment of the wiper assembly according to the instant invention. In FIG. 2, reference numerals 1, 2 and 4 – 7 designate the parts indicated by the same reference numerals in FIG. 1. Reference numeral 3' designates an arm piece consisting of two rods which have one ends welded to the retainer 2 and the other end extremities shaped flat to form flat portions 3'a as shown in FIG. 4, each of said flat portions 3'a being provided with a hole 13. Reference numeral 14 designates a bolt which is extended through the holes 13 in the flat end portions 13 of the arm piece 3' and holes 7a formed in the longitudinal side walls of the primary yoke 7, thereby to pivotably connect said arm piece 3' and said primary yoke 7 with each other. The bolt 14 is tightened integrally with the arm piece 3' by a nut 15. Reference numeral 16 designates a collar fitted around the bolt 14 between the two rods of the arm piece 3' for integrally combining the rods 3' with each other to stabilize the same strengthwise. Reference numeral 17 designates a spring to hold the blade element in pressure contact with the glass.

With the construction described above, the position of the retainer 2 relative to the arm head 1 is shifted, during operation of the wiper assembly, according to the countour of the glass under the biasing force of the spring 17, and further, since the arm piece 3' and the primary yoke 7 are pivotably connected with each other, the relative position of said arm piece 3' and the blade element is also shifted, whereby a satisfactory glass wiping operation can be obtained.

It is to be noted that the collar 16 in the embodiment described above is provided for the purpose of increasing the stability in strength of the arm piece 3' and the object of the invention can be sufficiently achieved without said collar 16. It is also to be noted that a rivet may of course be used in place of the bolt 14 and the nut 15.

What is claimed is:

1. A wiper assembly for vehicles, of the type including an arm having an arm piece consisting of two rods, and a blade element having a yoke for supporting a blade, wherein the end extremities of said rods of the arm piece are shaped flat to form flat portions, and said arm piece and said yoke are pivotably connected with each other by means of a pivot pin extending through holes formed in said flat portions of said rods and holes formed in said yoke.

2. A wiper assembly according to claim 1, wherein said pivot pin is composed of a bolt, a nut and a collar fitted around said bolt.

3. A wiper assembly according to claim 1, wherein said pivot pin is composed of a rivet and a collar fitted around said rivet.

* * * * *